United States Patent
Liu et al.

(10) Patent No.: US 11,204,162 B2
(45) Date of Patent: Dec. 21, 2021

(54) METHOD FOR CONTROLLING COAL SUPPLY QUANTITY DURING TRANSIENT LOAD-VARYING PROCESS CONSIDERING EXERGY STORAGE CORRECTION OF BOILER SYSTEM OF COAL-FIRED UNIT

(71) Applicant: XI'AN JIAOTONG UNIVERSITY, Shaanxi (CN)

(72) Inventors: Ming Liu, Shaanxi (CN); Yongliang Zhao, Shaanxi (CN); Junjie Yan, Shaanxi (CN); Daotong Chong, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/284,785

(22) PCT Filed: Jun. 22, 2019

(86) PCT No.: PCT/CN2019/092431
§ 371 (c)(1),
(2) Date: Apr. 12, 2021

(87) PCT Pub. No.: WO2020/181679
PCT Pub. Date: Sep. 17, 2020

(65) Prior Publication Data
US 2021/0317983 A1    Oct. 14, 2021

(30) Foreign Application Priority Data
Mar. 13, 2019    (CN) .......................... 201910189042.7

(51) Int. Cl.
*G05B 13/02* (2006.01)
*F23N 1/00* (2006.01)
(Continued)

(52) U.S. Cl.
CPC ............ *F22B 35/18* (2013.01); *G05B 19/042* (2013.01); *G05B 2219/2639* (2013.01)

(58) Field of Classification Search
CPC .................. F22B 35/18; G05B 19/042; G05B 2219/2639
See application file for complete search history.

(56) References Cited

U.S. PATENT DOCUMENTS

2016/0178129 A1\* 6/2016 Chen ...................... F25J 1/0242
62/50.3

OTHER PUBLICATIONS

Ayyagari, Saiprem, "Use of Energy and Exergy Analysis in Coal Fired Boiler", Mar. 2014, International Journal of Multidisciplinary Sciences and Engineering, vol. 5, No. 3, https://www.researchgate.net/publication/269405236_Use_of_Energy_and_Exergy_Analysis_in_Coal_Fired_Boiler.\*

(Continued)

*Primary Examiner* — Charles R Kasenge

(57) ABSTRACT

A method for controlling a coal supply quantity during a transient load-varying process considering exergy storage correction of a boiler system of a coal-fired unit is provided. Temperatures and pressures of working fluid and metal heating surface of the boiler system of the coal-fired unit are measured and recorded in real-time, and converted into the exergy storage amount at different operating load points. During the transient operation process, the real-time exergy storage amount of the boiler system is compared with the exergy storage amount at the corresponding steady-state load point, and the real-time exergy storage variation is obtained; thereafter, the feed-forward control signal of coal supply quantity input is superposed to the existing coal supply quantity command of the boiler system, and the coal supply quantity signal of the boiler system based on the exergy storage correction is finally generated.

2 Claims, 2 Drawing Sheets

(51) Int. Cl.
*F22B 35/00* (2006.01)
*F22B 35/18* (2006.01)
*G05B 19/042* (2006.01)

(56) References Cited

OTHER PUBLICATIONS

Richards, Tobias, "Exergy Analysis of Solid Fuel-Fired Heat and Power Plants: A Review", Feb. 1, 2017, MDPI, https://www.mdpi.com/1996-1073/10/2/165/htm.*

* cited by examiner

METHOD FOR CONTROLLING COAL SUPPLY QUANTITY DURING TRANSIENT LOAD-VARYING PROCESS CONSIDERING EXERGY STORAGE CORRECTION OF BOILER SYSTEM OF COAL-FIRED UNIT

BACKGROUND OF THE PRESENT INVENTION

Field of Invention

The present invention relates to a technical field of thermal control of thermal power plants, and more particularly to a method for controlling a coal supply quantity during a transient load-varying process considering exergy storage correction of a boiler system of a coal-fired unit.

Description of Related Arts

In the electric power structural system of China, the installed capacity of renewable energy is over one-third of the total install capacity, wherein the installed capacities of wind energy and solar energy both rank the first in the world. However, the large-scale grid-connected power generation of the intermittent energy such as wing energy and solar energy aggravates the grid fluctuation and meanwhile decreases the peak-regulation capacity ratio of the grid system, causing the consumption difficulty of the electric power of renewable energy and serious abandonment problems of wind energy and solar energy in some areas. In order to effectively consume the electric power of renewable energy, the fossil energy power plants mainly based on coal firing are necessary, for improving the amplitude and rate of load varying, namely improving the operational flexibility. However, during the frequent load-varying process of the coal-fired unit, due to the problems of non-linearity, large inertia and long time-delay of the boiler system, if the stored heat of the boiler system cannot be effectively released, over-temperature of the important metal heating surface will be caused, safety of the coal-fired unit will be influenced, and the excess coal quantity will bring the poor economy; on the other hand, if the heat of the boiler system cannot be effectively stored, the parameter quality will be low, and the economy will be poor. Thus, how to realize the high-efficient, safe and flexible energy conversion in the thermo-dynamic system of the coal-fired power plants has become the bottleneck which restricts the low-carbon and clean-energy development of the power industry of China.

SUMMARY OF THE PRESENT INVENTION

Aiming at the transient load-varying process during which the coal-fired unit involves in the operational flexibility regulation, the present invention corrects the control strategy of water-fuel ratio of the boiler system of the conventional coal-fired unit and tries to solve the problem of the contradiction among flexibility, safety and economy of the coal-fired unit from the exergy storage which is the essence of heat storage and release during the transient load-varying process. The present invention provides a method for controlling a coal supply quantity during the transient load-varying process considering exergy storage correction of the boiler system of the coal-fired unit. According to the exergy storage variation between the steady-state and transient load-varying processes of the boiler system, the method performs feed-forward regulation to the coal supply quantity at the boiler inlet, so as to realize the dynamic accurate control of the inlet coal quantity, ensure the stability of the parameter of each thermodynamic device, improve the outlet parameter quality of the coal-fired unit, and weaken the effects of thermal inertia and time delay, thereby greatly improving the economy and safety of the system.

To solve the above technical problem, the present invention adopts technical solutions as follows.

A method for controlling a coal supply quantity during a transient load-varying process considering exergy storage correction of a boiler system of a coal-fired unit is provided, which adopts an exergy storage variation between steady-state and transient load-varying processes of the boiler system of the coal-fired unit as a feed-forward signal of main-steam temperature control of the boiler system, so as to correct the coal supply quantity of the boiler system during the transient load-varying process, comprising steps of:

(1) obtaining an exergy storage amount of each thermodynamic device of the boiler system of the coal-fired unit, particularly comprising steps of:

for an $i^{th}$ boiler superheater, obtaining a pressure $P_{s,i}$ of working fluid in the $i^{th}$ boiler superheater through a pressure sensor, and obtaining a temperature $T_{s,i}$ of the working fluid and a temperature $T_{w,i}$ of a metal heating surface of the $i^{th}$ boiler superheater through temperature sensors; looking up a calculation table of water and steam properties, and calculating a total exergy storage amount $Ex_i$ of the $i^{th}$ boiler superheater in a current state; wherein: the total exergy storage amount $Ex_i$ comprises an exergy storage amount of the working fluid and an exergy storage amount of the metal heating surface;

$$Ex_i = Ex_{s,i} + Ex_{m,i};$$

$$Ex_{s,i} = M_s \cdot [u(P_{s,i}, T_{s,i}) - u_0 - T_0 \cdot (s(P_{s,i}, T_{s,i}) - s_0)];$$

$$Ex_{m,i} = M_m \cdot C_m [T_{m,i} - T_0 - T_0 \cdot \ln(T_{m,i}/T_0)];$$

in the formulas, $Ex_{s,i}$ and $Ex_{m,i}$ are respectively the exergy storage amounts of the working fluid and the metal heating surface in the $i^{th}$ boiler superheater, in unit of kJ; $M_s$ and $M_m$ are respectively a mass of the working fluid and a mass of the metal heating surface of the $i^{th}$ boiler superheater, in unit of kg; $T_0$ is an ambient temperature, in unit of K; $u_0$ is a corresponding enthalpy under the ambient temperature and an ambient pressure, in unit of kJ/kg; $s_0$ is a corresponding entropy under the ambient temperature and the ambient pressure, in unit of kJ/(kg·K); $u(P_{s,i}, T_{s,i})$ is an internal energy of the working fluid, which is calculated through the pressure $P_{s,i}$ of the working fluid and the temperature $T_{s,i}$ of the working fluid, in unit of kJ; $s(P_{s,i}, T_{s,i})$ is an entropy of the working fluid, which is calculated through the pressure $P_{s,i}$ of the working fluid and the temperature $T_{s,i}$ of the working fluid, in unit of kJ/(kg·K); $C_m$ is a specific heat capacity of the metal heating surface of the $i^{th}$ boiler superheater, in unit of kJ/(kg·K); and $T_{m,i}$ is an average temperature of the metal heating surface of the $i^{th}$ boiler superheater, in unit of K;

the boiler system consists of a plurality of thermodynamic devices, so that a total exergy storage amount Ex of the boiler system is a sum of the exergy storage amounts of the thermodynamic devices, wherein:

$$Ex = \sum_{i=1}^{n} Ex_i;$$

in the formula, Ex is the total exergy storage amount of the boiler system, and n is a total number of the thermodynamic devices of the boiler system;

(2) obtaining a real-time exergy storage variation of the boiler system of the coal-fired unit during the transient load-varying process, particularly comprising steps of:

firstly, according to temperature and pressure data of each thermodynamic device when the boiler system operates at each steady-state load point, obtaining a steady-state exergy storage amount $Ex_{t,0}$ of the boiler system; during a transient operation process of the coal-fired unit, according to measured real-time temperature and pressure data of each thermodynamic device, obtaining a real-time exergy storage amount $Ex_{t,1}$ of the boiler system; and obtaining the real-time exergy storage variation $\Delta Ex_t$ of the boiler system through a comparator, $\Delta Ex_t = Ex_{t,0} - Ex_{t,1}$;

(3) generating a feed-forward control signal based on the real-time exergy storage variation of the boiler system, particularly comprising steps of:

according to the obtained real-time exergy storage variation $\Delta Ex_t$ of the boiler system, obtaining a feed-forward control signal of a coal supply quantity input, $\Delta B = \Delta Ex_t \cdot \xi$; wherein:

in the formula, $\Delta B$ is the feed-forward control signal of the coal supply quantity input, and $\xi$ is a conversion coefficient; and (4) correcting the coal supply quantity of the boiler system during the load-varying process, particularly comprising steps of:

superposing the feed-forward control signal $\Delta B$ of the coal supply quantity input to an uncorrected coal supply quantity command B of the boiler system, and finally generating a corrected coal supply quantity signal B' of the boiler system based on the exergy storage correction of the boiler system, $B' = B + \Delta B$.

Preferably, during a load-increasing process, the steady-state exergy storage amount of the boiler system is larger than the real-time exergy storage amount at an operating load point, so that the conversion coefficient $\xi$ is positive; the feed-forward control signal accelerates coal supply, so as to ensure that an outlet steam parameter of the coal-fired unit maintains a high level and improve economy of the coal-fired unit;

during a load-decreasing process, the steady-state exergy storage amount of the boiler system is smaller than the real-time exergy storage amount at the operating load point, so that the conversion coefficient $\xi$ is negative; the feed-forward control signal decelerates coal supply, so as to prevent over-temperature of each thermodynamic device and the outlet steam parameter of the coal-fired unit and improve safety of the coal-fired unit.

Compared with the prior art, the present invention has advantages as follows.

First, based on the second law of thermodynamics, from the point of energy transfer, the present invention tracks the exergy storage amount of the boiler system of the coal-fired unit in real-time, and introduces the exergy storage variation between the transient process and the steady-state process into the feed-forward control of coal supply of the boiler system, so as to effectively improve the economy and safety of the boiler system with ensuring the flexibility of rapid load varying of the coal-fired unit.

Second, the present invention can be easily implemented with no extra equipment, low investment and short recycling period.

DETAILED DESCRIPTION OF THE PREFERRED EMBODIMENT

The present invention is further illustrated with the accompanying drawings and the preferred embodiment.

Figure 1:
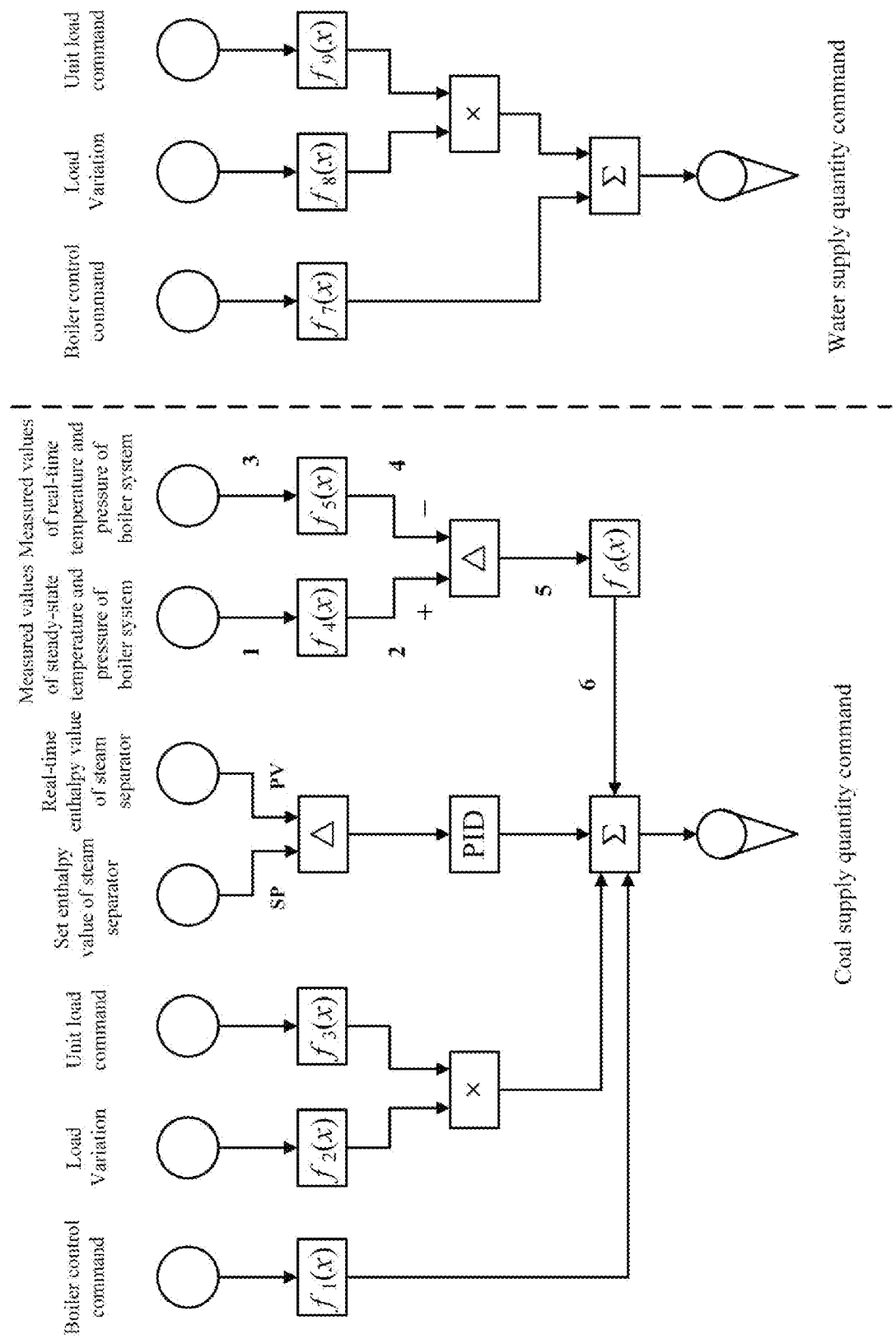
FIG. 1 shows a control logic of a water-fuel ratio during a transient load-varying process based on coal supply quantity correction of a boiler system.

The main purpose of control of the boiler system of the conventional coal-fired unit is to involve in the coordinated control of the coal-fired unit and ensure the stability of the steam parameter, wherein: the water-fuel ratio is an important control parameter and can be adjusted through controlling the water supply quantity and coal supply quantity. The present invention corrects the control logic of coal and water. During the transient load-varying process, in the conventional control system (as shown in FIG. 1), the water supply quantity command is firstly determined according to the boiler control command and the load variation; for the coal supply quantity command, the basic control signal is generated according to the boiler control command and the load variation, and then the water-fuel ratio is corrected according to the enthalpy difference of the steam separator, so as to ensure the quality and stability of the outlet parameter of the boiler system.

However, due to the huge boiler system and the numerous thermodynamic devices, during the transient process, the release and storage of heat both have large inertia and long time-delay; if controlling only through the load command, it easily causes the insufficient parameter quality and over-temperature. Meanwhile, in the stored heat of the boiler system, only a part of the exergy storage amount can actually improve the steam parameter and finally be converted into the power capability of the coal-fired unit. Thus, the exergy storage variation between the transient and steady-state processes of the boiler system is adopted as the feed-forward signal and reflected in the basic control strategy of coal and water. FIG. 1 shows the detailed introduced control logic and it illustrates that: in the process of "1", during the steady-state operation process, the temperature and pressure data of each thermodynamic device, which is measured at the temperature and pressure measurement points, are transmitted to $f_4(x)$; in the process of "2", the exergy storage amount at each steady-state load point, which is obtained in $f_4(x)$, is fitted into the function or table, and the data is transmitted to the comparator in real-time; in the process of "3", during the transient load-varying process, the temperature and pressure data of each thermodynamic device, which is measured at the temperature and pressure measurement points, are transmitted to $f_5(x)$; in the process of "4", the real-time exergy storage amount under the operating condition, which is obtained in $f_5(x)$, is transmitted to the comparator in real-time; in the process of "5", the comparator subtracts the real-time exergy storage amount under the operating condition from the exergy storage amount at the corresponding steady-state load point and obtains the real-time exergy storage variation, and then the real-time exergy storage variation is transmitted to $f_6(x)$; in the process of "6", $f_6(x)$ converts the exergy storage variation into the feed-forward control command of coal and water of the boiler system, and then superposes to the coal supply quantity command.

Figure 2:
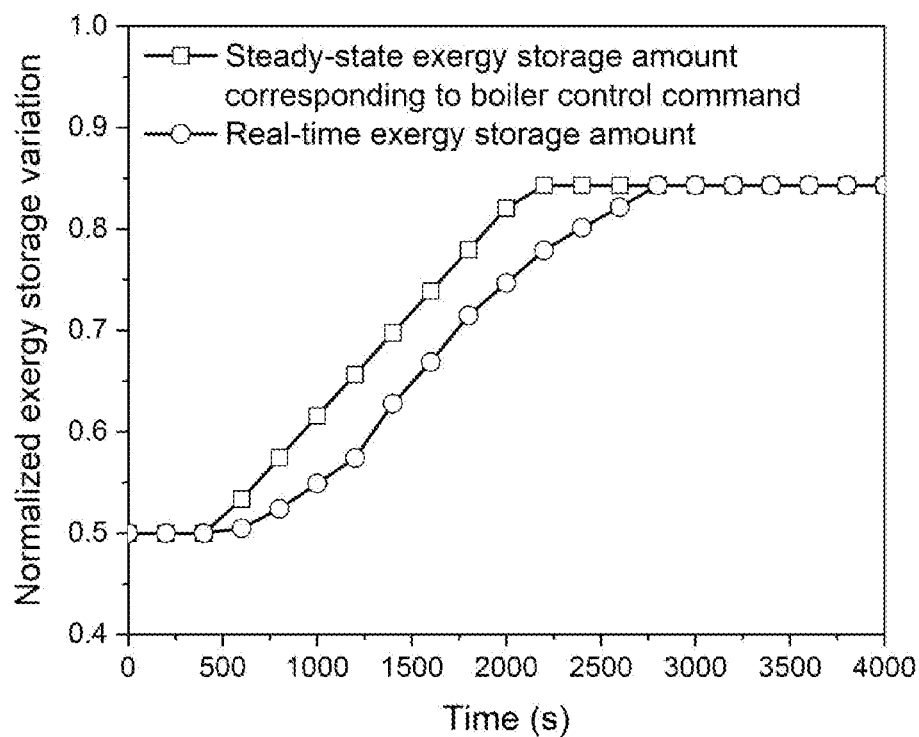
FIG. 2 shows variation trends of a steady-state exergy storage amount and a real-time exergy storage amount of the boiler system during a load-increasing process.

FIG. 2 illustrates that: during the load-increasing process, the steady-state exergy storage amount of the boiler system at each load point is larger than the real-time exergy storage amount; through the method provided by the present invention, the feed-forward signal accelerates coal supply, so that the outlet steam parameter of the coal-fired unit maintains a high level and the economy of the coal-fired unit is improved.

Figure 3:
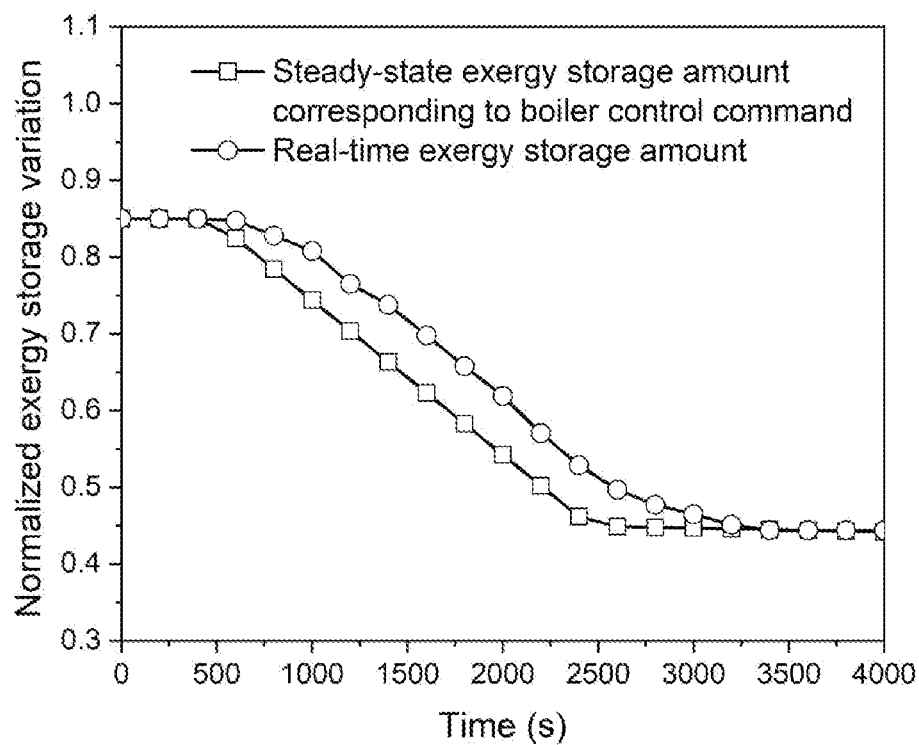
FIG. 3 shows variation trends of the steady-state exergy storage amount and the real-time exergy storage amount of the boiler system during a load-decreasing process.

FIG. 3 illustrates that: during the load-decreasing process, the steady-state exergy storage amount of the boiler system at each load point is smaller than the real-time exergy storage amount; through the method provided by the present invention, the feed-forward signal decelerates coal supply, so as to prevent over-temperature of each thermodynamic device and the outlet steam parameter of the coal-fired unit, and ensure the safety of the coal-fired unit.

What is claimed is:

1. A method for controlling a coal supply quantity during a transient load-varying process considering exergy storage correction of a boiler system of a coal-fired unit, which adopts an exergy storage variation between steady-state and transient load-varying processes of the boiler system of the coal-fired unit as a feed-forward signal of main-steam temperature control of the boiler system, so as to correct the coal supply quantity of the boiler system during the transient load-varying process, comprising steps of:

(1) obtaining an exergy storage amount of each thermodynamic device of the boiler system of the coal-fired unit, particularly comprising steps of:

for an $i^{th}$ boiler superheater, obtaining a pressure $P_{s,i}$ of working fluid in the $i^{th}$ boiler superheater through a pressure sensor, and obtaining a temperature $T_{s,i}$ of the working fluid and a temperature $T_{w,i}$ of a metal heating surface of the $i^{th}$ boiler superheater through temperature sensors; looking up a calculation table of water and steam properties, and calculating a total exergy storage amount $Ex_i$ of the $i^{th}$ boiler superheater in a current state; wherein: the total exergy storage amount $Ex_i$ comprises an exergy storage amount of the working fluid and an exergy storage amount of the metal heating surface;

$Ex_i = Ex_{s,i} + Ex_{m,i}$;

$Ex_{s,i} = M_s \cdot [u(P_{s,i}, T_{s,i}) - u_0 - T_0 \cdot (s(P_{s,i}, T_{s,i}) - s_0)]$;

$Ex_{m,i} = M_m \cdot C_m [T_{m,i} - T_0 - T_0 \cdot \ln(T_{m,i}/T_0)]$;

in the formulas, $Ex_{s,i}$ and $Ex_{m,i}$ are respectively the exergy storage amounts of the working fluid and the metal heating surface in the $i^{th}$ boiler superheater, in unit of kJ; $M_s$ and $M_m$ are respectively a mass of the working fluid and a mass of the metal heating surface of the $i^{th}$ boiler superheater, in unit of kg; $T_0$ is an ambient temperature, in unit of K; $u_0$ is a corresponding enthalpy under the ambient temperature and an ambient pressure, in unit of kJ/kg; $s_0$ is a corresponding entropy under the ambient temperature and the ambient pressure, in unit of kJ/(kg·K); $u(P_{s,i}, T_{s,i})$ is an internal energy of the working fluid, which is calculated through the pressure $P_{s,i}$ of the working fluid and the temperature $T_{s,i}$ of the working fluid, in unit of kJ; $s(P_{s,i}, T_{s,i})$ is an entropy of the working fluid, which is calculated through the pressure $P_{s,i}$ of the working fluid and the temperature $T_{s,i}$ of the working fluid, in unit of kJ/(kg·K); $C_m$ is a specific heat capacity of the metal heating surface of the $i^{th}$ boiler superheater, in unit of kJ/(kg·K); and $T_{m,i}$ is an average temperature of the metal heating surface of the $i^{th}$ boiler superheater, in unit of K;

the boiler system consists of a plurality of thermodynamic devices, so that a total exergy storage amount Ex of the boiler system is a sum of the exergy storage amounts of the thermodynamic devices, $$Ex = \sum_{i=1}^{n} Ex_i;$$

wherein:
in the formula, Ex is the total exergy storage amount of the boiler system, and n is a total number of the thermodynamic devices of the boiler system;

(2) obtaining a real-time exergy storage variation of the boiler system of the coal-fired unit during the transient load-varying process, particularly comprising steps of:

firstly, according to temperature and pressure data of each thermodynamic device when the boiler system operates at each steady-state load point, obtaining a steady-state exergy storage amount $Ex_{t,0}$ of the boiler system; during a transient operation process of the coal-fired unit, according to measured real-time temperature and pressure data of each thermodynamic device, obtaining a real-time exergy storage amount $Ex_{t,1}$ of the boiler system; and obtaining the real-time exergy storage variation $\Delta Ex_t$ of the boiler system through a comparator, $\Delta Ex_t = Ex_{t,0} - Ex_{t,1}$;

(3) generating a feed-forward control signal based on the real-time exergy storage variation of the boiler system, particularly comprising steps of:

according to the obtained real-time exergy storage variation $\Delta Ex_t$ of the boiler system, obtaining a feed-forward control signal of a coal supply quantity input, $\Delta B = \Delta Ex_t \cdot \xi$; wherein:

in the formula, $\Delta B$ is the feed-forward control signal of the coal supply quantity input, and $\xi$ is a conversion coefficient; and (4) correcting the coal supply quantity of the boiler system during the load-varying process, particularly comprising steps of:

superposing the feed-forward control signal $\Delta B$ of the coal supply quantity input to an uncorrected coal supply quantity command B of the boiler system, and finally generating a corrected coal supply quantity signal B' of the boiler system based on the exergy storage correction of the boiler system, $B' = B + \Delta B$.

2. The method, as recited in claim 1, wherein: during a load-increasing process, the steady-state exergy storage amount of the boiler system is larger than the real-time exergy storage amount at an operating load point, so that the conversion coefficient $\xi$ is positive; the feed-forward control signal accelerates coal supply, so as to ensure that an outlet steam parameter of the coal-fired unit maintains a high level and improve economy of the coal-fired unit;

during a load-decreasing process, the steady-state exergy storage amount of the boiler system is smaller than the real-time exergy storage amount at the operating load point, so that the conversion coefficient $\xi$ is negative; the feed-forward control signal decelerates coal supply, so as to prevent over-temperature of each thermodynamic device and the outlet steam parameter of the coal-fired unit and improve safety of the coal-fired unit.

* * * * *